US008348316B2

(12) United States Patent  (10) Patent No.: US 8,348,316 B2
Hemmings  (45) Date of Patent: Jan. 8, 2013

(54) ANGULAR COOKING TONGS FOR MANIPULATING DELICATE FOOD ITEMS

(76) Inventor: Barry E. Hemmings, Brentwood (GB)

( * ) Notice: Subject to any disclaimer, the term of this patent is extended or adjusted under 35 U.S.C. 154(b) by 0 days.

(21) Appl. No.: 13/289,557

(22) Filed: Nov. 4, 2011

(65) Prior Publication Data

US 2012/0049549 A1 Mar. 1, 2012

Related U.S. Application Data

(63) Continuation of application No. PCT/GB2010/050654, filed on Apr. 22, 2010.

(30) Foreign Application Priority Data

May 7, 2009 (GB) .................................. 0907834.6

(51) Int. Cl.
A47J 43/28 (2006.01)
(52) U.S. Cl. ........................................... 294/7; 294/99.2
(58) Field of Classification Search ............... 294/26, 294/99.2, 3, 5, 7, 8, 8.5, 11; 30/324, 123, 30/147, 148, 149, 150; D7/685, 686; 7/109, 7/110, 112, 113
See application file for complete search history.

(56) References Cited

U.S. PATENT DOCUMENTS

| D76,013 | S | * | 8/1928 | Gordon | 30/150 |
| 2,455,623 | A | | 12/1948 | Stone | |
| D266,640 | S | * | 10/1982 | Trombly | D7/686 |
| D351,534 | S | * | 10/1994 | Weber | D7/686 |
| 5,403,052 | A | * | 4/1995 | Lampron | 294/7 |
| D364,783 | S | * | 12/1995 | Weber | D7/686 |
| 5,934,721 | A | * | 8/1999 | Walde | 294/7 |
| 6,129,398 | A | * | 10/2000 | Calhoun | 294/99.2 |
| D481,915 | S | * | 11/2003 | Mezger-Boehringer | D7/686 |
| D502,367 | S | * | 3/2005 | Claypool et al. | D7/686 |
| 7,249,793 | B1 | | 7/2007 | Jabr | |
| 2005/0166406 | A1 | * | 8/2005 | Cornfield | 30/324 |
| 2006/0255605 | A1 | * | 11/2006 | Yu | 294/7 |
| 2008/0030034 | A1 | | 2/2008 | Balaciano | |
| 2008/0088142 | A1 | * | 4/2008 | Lubenesky et al. | 294/99.2 |
| 2009/0172952 | A1 | * | 7/2009 | Hoover et al. | 30/345 |

FOREIGN PATENT DOCUMENTS

GB 1 104 919 3/1968
GB 1 507 625 4/1978

OTHER PUBLICATIONS

International Search Report with Written Opinion for corresponding International Application No. PCT/GB2010/050654, mailed on May 7, 2010.

* cited by examiner

Primary Examiner — Paul T Chin
(74) Attorney, Agent, or Firm — Myers Wolin, LLC

(57) ABSTRACT

Cooking tongs comprise a flat slice portion (1) and a dished portion (2) mounted on elongate arms (3, 4) with a spring hinge (5) therebetween biasing the portions to a spaced apart position. The dished portion comprises a forward edge which is substantially straight, when viewed in plan, a concave part (9) adapted to accommodate the yolk portion of a frying egg, and a periphery (8) around said concave part lying in a single plane. The portions are mounted on the respective arms in such a manner as to permit the flat surface to engage the flat slice portion uniformly when the portions are pressed together, whereby to engage the white of said egg around the yolk, in use.

10 Claims, 3 Drawing Sheets

US 8,348,316 B2

ANGULAR COOKING TONGS FOR MANIPULATING DELICATE FOOD ITEMS

CROSS REFERENCE TO RELATED APPLICATIONS

The present application is a continuation of International Application No. PCT/GB2010/050654 filed on Apr. 22, 2010, which claims priority to GB Patent Application No. 0907834.6 filed on May 7, 2009, the contents of each of which is incorporated herein by reference.

FIELD OF THE INVENTION

This invention relates to cooking tongs for use manipulating delicate food items such as soft fried eggs.

BACKGROUND TO THE INVENTION

In the shallow frying of eggs in such a manner as to leave the yolk soft but avoiding uncooked egg white, it is desirable to turn the egg over in the hot oil or fat briefly to complete the cooking of the white and to seal the yolk without cooking it through. The turning over of the egg requires considerable dexterity to avoid breaking the yolk, which results in a less attractive appearance and solidifies all the yolk, and to avoid splashing hot oil or fat, which is potentially dangerous to the cook and involves some fire risk if the oil or fat contacts the gas flame or the hot electric element.

Kitchen tongs are well-known, and various different forms have been proposed, for example in GB1104919, where the tongs disclosed comprise a spoon-like member and a flattish member, formed from plastics and hinged together by studs on one member engaging with holes in the other, to permit separation for cleaning. U.S. Pat. No. 7,086,676 discloses spring-loaded tongs having a curved member and a flat member for grasping food items. Similarly, U.S. Pat. No. 7,249,793 discloses tongs having spoon and fork structures whose handles are joined. US2008030034 discloses tongs of various different configurations with angled members intended to trap the food items between them for lifting.

Conventional tongs do not guarantee that delicate materials such as soft egg yolks remain undamaged during manipulation, for example inversion.

SUMMARY OF THE INVENTION

According to the invention, there are provided cooking tongs comprising a flat slice portion and a dished portion angularly mounted on respective elongate arms with a spring hinge therebetween biasing the portions to a spaced apart position, the dished portion comprising a forward edge which is curved upwardly when viewed on an end elevation, a concave part adapted to accommodate the yolk portion of a frying egg and having a periphery lying in a single plane around a substantial part of the circumference of the concave portion, whereby the transition between the concave part and the periphery is a continuous and uniform curve to avoid any edges or projections, the portions being mounted on the respective arms in such a manner as to permit the periphery of the concave part to engage the flat slice portion uniformly when the portions are pressed together, whereby to engage the white of said egg around the yolk, in use, and to permit the flat slice portion to engage with the cooking surface.

The transition between the concave part and the periphery is smooth and free from any projections so that an egg may slide over the surface without damaging the surface thereof.

The tongs are preferably moulded in a heat resisting non-stick plastics material such as a fluoropolymer. The spring hinge may be integrally formed from the same plastics material, or it may be in the form of a spring steel insert which is attached to the arms, or encapsulated in the plastics material during the moulding process, which is suitably an injection moulding process.

Alternatively, the tongs may be formed of metal, for example a springy steel, and may be partially or completely coated with a non-stick plastics material. The hinge may alternatively be provided with a separate spring to bias the two arms away from each other.

BRIEF DESCRIPTION OF THE DRAWINGS

In the drawings, which illustrate an exemplary embodiment of the invention.

DETAILED DESCRIPTION OF THE ILLUSTRATED EMBODIMENT

Figure 3:
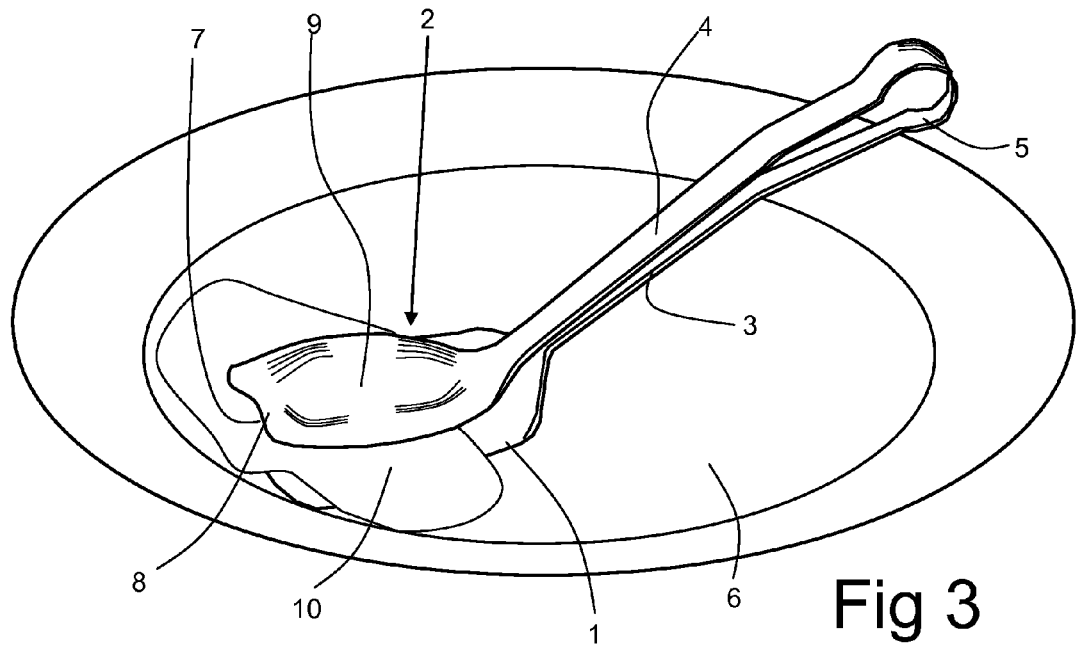
Figure 4:
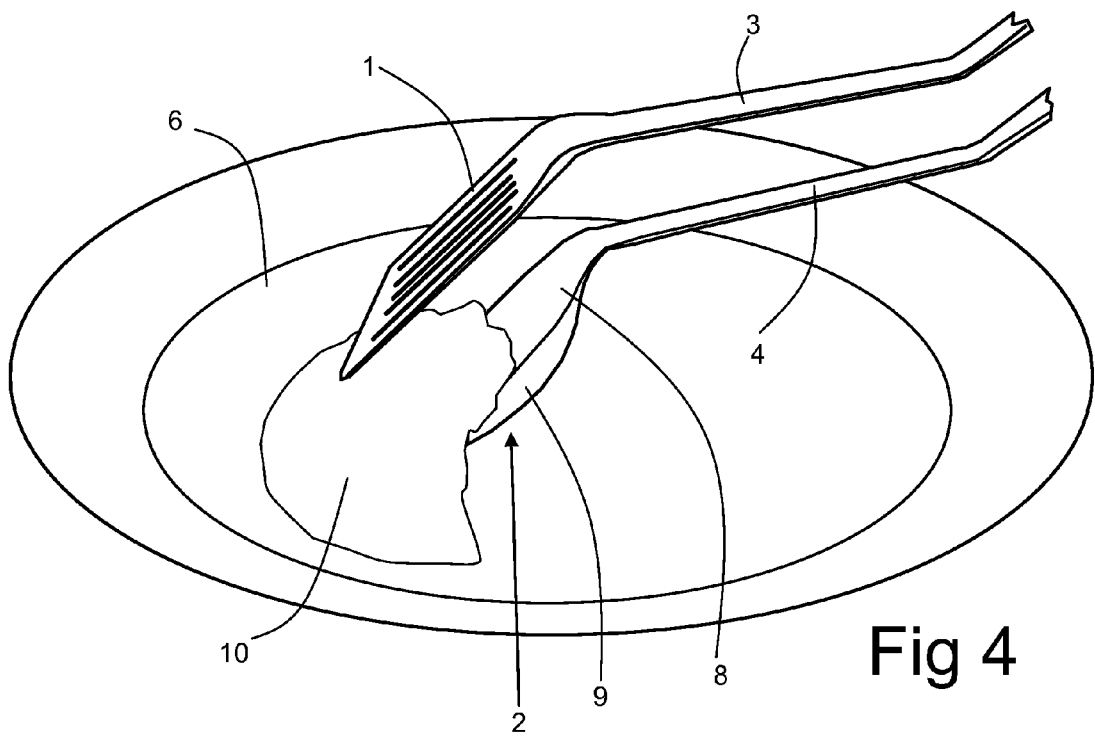
Figure 5:
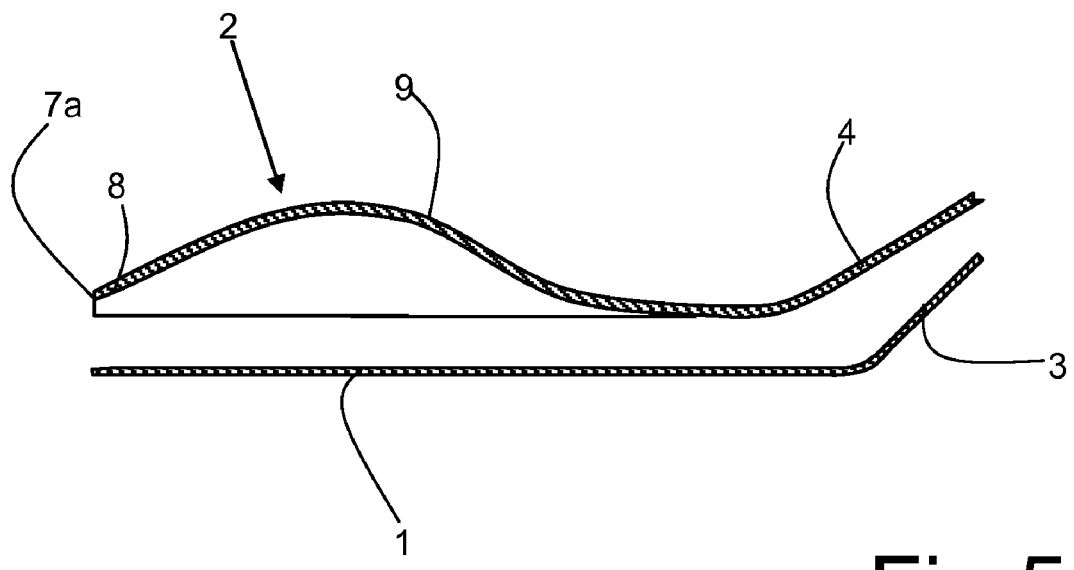
FIG. 5 is an enlarged longitudinal sectional view of one end of the tongs.

The tongs, which are conveniently moulded in a heat-resistant plastics material, for example a fluoropolymer such as poly(tetrafluoroethylene), comprise a flat slice portion 1 and a dished portion 2, having arms 3 and 4 extending from them, joined at a spring loop hinge 5 which permits the dished portion 2 to be pressed on to the flat portion 1, but to spring to a rest position in which the two portions 1 and 2 are spaced apart. The flat slice portion 1 has slots therein to drain away fat etc, in conventional manner, and is angled at around 30° relative to its arm 3 so that the slice portion can be placed flat on the bottom of a frying pan 6 (FIGS. 2-4) while being held by the user well clear of the hot pan surface. The dished portion 2 is similarly angled relative to its arm 4 so that, when the dished portion 2 is pressed flat against the slice portion 1, the arms 3 and 4 are approximately parallel with each other. As may best be seen from FIG. 5, the dished portion 2 is provided with a straight front edge 7, when viewed in plan, having an upward smoothly curved opening 7a when viewed from the end, to allow the cooked yoke of the egg to slide out of the dished portion when it is inverted, as hereinafter described. The remainder of the periphery 8 of the dished portion 2 is generally planar, curving gently into a concave part 9 of sufficient depth to accommodate an egg yolk, for example having a depth of 5-10 mm. The periphery 8 engages the egg white surrounding the yolk uniformly and holds it against the flat slice portion 1 during manipulation of the egg.

Figure 1:
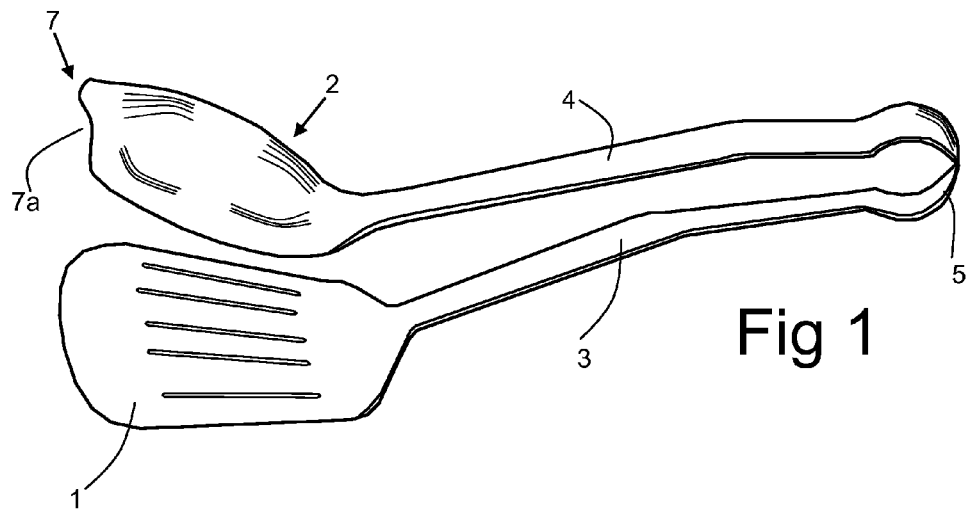
FIG. 1 is a perspective view of the tongs.
Figure 2:
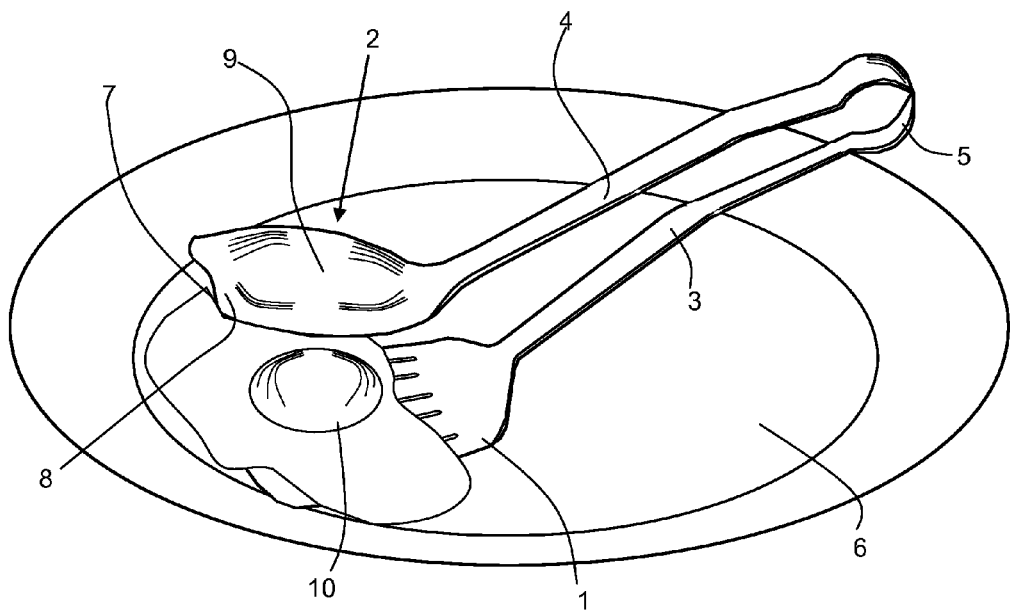
FIGS. 2 to 4 are views showing successive stages in using the tongs to turn over a fried egg in a frying pan.

FIG. 2 shows the egg after frying sufficiently to set the white, but while still partially uncooked on top. The flat slice portion of the tongs is slid underneath the egg 10, while the dished portion 2 is held clear of the egg by the spring action of the hinge 5. The arm 4 is then pressed gently towards the arm 3 to bring the dished portion on to the upper surface of the egg 10, as may be seen from FIG. 3. With the egg 10 held gently between the flat slice portion 1 and the dished portion 2, with the yolk of the egg enclosed in the concave part 9 and the periphery 8 engaging the white, the tongs are then rotated so as to invert the egg. The forward edge 7 of the dished portion of the tongs is then held against the surface of the pan 6 and with the flat portion 1 at an oblique angle to the surface, and the arm 3 is then released to allow the flat slice portion 1 to spring upwardly away from the egg 10, releasing the egg and allowing it to slide gently off the dished portion 2 and on to the pan to fry the surface of the yolk briefly. The tongs can then be used to lift the egg again and invert it in a similar operation to that hereinbefore described, so that it can be served on a plate with the yolk uppermost. Because the surface of the yolk has been set by the additional cooking, it is less vulnerable to breaking, and it will not matter whether the slice or the dished portion is slid under the egg at the start of the second turning operation.

Because the forward edge 7 of the dished portion 2 is substantially straight and provided with a central upward curve 7a when viewed in end elevation, the transition from the periphery 8 to the concave part 9 is smooth, and the surface of the tongs is also formed so as to be free from any sharp edges or obstructions, the risk of damage to the soft egg yolk is minimised, permitting the egg turning operation to be repeated successfully at will, with the minimum of skill required by the user.

It will be appreciated that, while a spring loop hinge is illustrated and described, other forms of spring hinge may be provided between the two arms of the tongs.

I claim:

1. Cooking tongs comprising a flat slice portion and a dished portion angularly mounted on respective elongate arms with a spring hinge therebetween biasing the portions to a space apart position, the dished portion comprising a forward edge which is curved upwardly when viewed on an end elevation, a concave part adapted to accommodate and enclose the yolk portion of a frying egg and having a periphery lying in a single plane substantially around the circumference of the concave part, whereby the transition between the concave part and the periphery is a continuous and uniform curve to avoid any edges or projections, the portions being mounted on the respective arms in such a manner as to permit the periphery of the concave part to engage the flat slice portion uniformly when the portions are pressed together, whereby to engage the white of said egg around the yolk, in use, and to permit the flat slice portion to engage with the cooking surface.

2. Cooking tongs according to claim 1, wherein the flat slice portion and the dished portion are moulded from a heat-resistant non-stick plastics material.

3. Cooking tongs according to claim 2, wherein the spring hinge is formed as a steel component attached to the flat slice portion and the dished portion.

4. Cooking tongs according to claim 3, wherein the spring hinge is encapsulated within an integral plastics moulding including the flat slice portion and the dished portion.

5. Cooking tongs according to claim 2, wherein the plastics material is a fluoropolymer.

6. Cooking tongs according to claim 1 formed of metal.

7. Cooking tongs according to claim 6, at least partially coated with a non-stick plastics material.

8. Cooking tongs according to claim 1, wherein the flat slice portion and the dished portion are moulded from a heat resistant non-stick plastics material.

9. Cooking tongs according to claim 1, formed from metal.

10. Cooking tongs according to claim 9, at least partially coated with a non-stick plastics material.

\* \* \* \* \*